United States Patent [19]

Kamae et al.

[11] Patent Number: 4,857,737
[45] Date of Patent: Aug. 15, 1989

[54] GAMMA RAY MEASUREMENT UTILIZING MULTIPLE COMPTON SCATTERING

[75] Inventors: Tuneyoshi Kamae, Tokyo; Ryoji Enomoto, Sakura, Japan

[73] Assignee: Hamamatsu Photonics K. K., Shizuoka, Japan

[21] Appl. No.: 80,015

[22] Filed: Jul. 31, 1987

[30] Foreign Application Priority Data

Aug. 4, 1986 [JP] Japan .................................. 61-183145
Dec. 25, 1986 [JP] Japan .................................. 61-314126

[51] Int. Cl.$^4$ ............................................. G01T 1/164
[52] U.S. Cl. ........................... 250/370.09; 250/363.02; 250/370.10
[58] Field of Search ................... 250/327.2 C, 327.2 B, 250/363 SB, 363 SR, 367, 369, 370.09, 370.10

[56] References Cited

U.S. PATENT DOCUMENTS

3,876,882  4/1975  Todd .............................. 250/370.09
4,581,535  4/1986  Komaki et al. ................... 250/327.2

FOREIGN PATENT DOCUMENTS

2749155  5/1978  Fed. Rep. of Germany ......................... 250/370.10

OTHER PUBLICATIONS

J. Simone, T. O'Neill, O. T. Tumer and A. D. Zych, "Monte Carlo Simulation of a New Gamma Ray Telescope", *IEEE Trans. on Nuclear Science*, vol. NS-32, No. 1, (Feb. 1985), pp. 124-128.

M. Singh and D. Doria, "Germanium-Scintillation Camera Coincidence Detection Studies for Imaging Single Photon Emitters", *IEEE Trans. on Nuclear Science*, vol. NS-31, No. 1, (Feb. 1984), pp. 594-598.

V. Schönfelder et al., "The Imaging Compton Telescope Comptel on the Gamma Ray Observatory", *IEEE Trans. on Nuclear Science*, vol. NS-31, No. 1, (Feb. 1984), pp. 766-770.

C. A. Carlsson and G. Alm Carlsson, "The Use of the Compton Effect in Diagnostic Radiology", *Proceedings of International School of Physics*, J. R. Greening, ed., pp. 459-473.

A. C. Damask, C. E. Swenberg, "New Techniques of Brain Studies: Autoradiography, Positron Annihilation, and Nuclear Magnetic Resonance", in *Medical Physics*, vol. 3, Academic Press, Inc., (1984), pp. 232-287.

T. Kamae, R. Enomoto and N. Hanada Galleys, "A New Method to Measure Energy, Direction, and Polarization of Gamma-Rays", *Nuclear Instruments and Methods in Physics Research*, North Holland, (1987).

Ronald J. Jaszczak, P. Edward Coleman and Chun Bin Lim, "Spect: Single Photon Emission Computed Tomography", *IEEE Transactions on Nuclear Science*, vol. NS-27, No. 3, (June 1980), pp. 1137-1153.

"A New Method to Measure Energy, Direction, and Polarization of Gamma Rays", T. Kamae, R. Enomoto and N. Hanada, *Nuclear Instruments and Methods in Physics Research*, A260, (1987), pp. 254-257.

"Prototype Design of Multiple Compton Gamma-Ray Camera"-T. Kamae, N. Hanada and R. Enomoto, Reprinted from *IEEE Transactions on Nuclear Science*, vol. 35, No. 1, Feb. 1988.

*Primary Examiner*—Constantine Hannaher
*Attorney, Agent, or Firm*—Oliff & Berridge

[57] ABSTRACT

A detecting unit is formed by disposing 2-dimensional position sensitive type radiation detectors in the form of a plurality of layers superposed on each other, each capable of determining position of each of the reactions in multiple Compton scatterings produced by a $\gamma$-ray in the detecting unit and the energy which the $\gamma$-ray loses there are measured with a high precision. For each of the reactions it is examined whether the energy and the momentum conservation laws are satisfied or not in order to estimate probable sequences of reactions and thus a first and a second reactions are identified and the direction of the incident $\gamma$-ray is presumed. The measurement precision is further improved by assigning the energy of the incident $\gamma$-ray presumed from the reactions to the energy of a line spectrum.

10 Claims, 9 Drawing Sheets

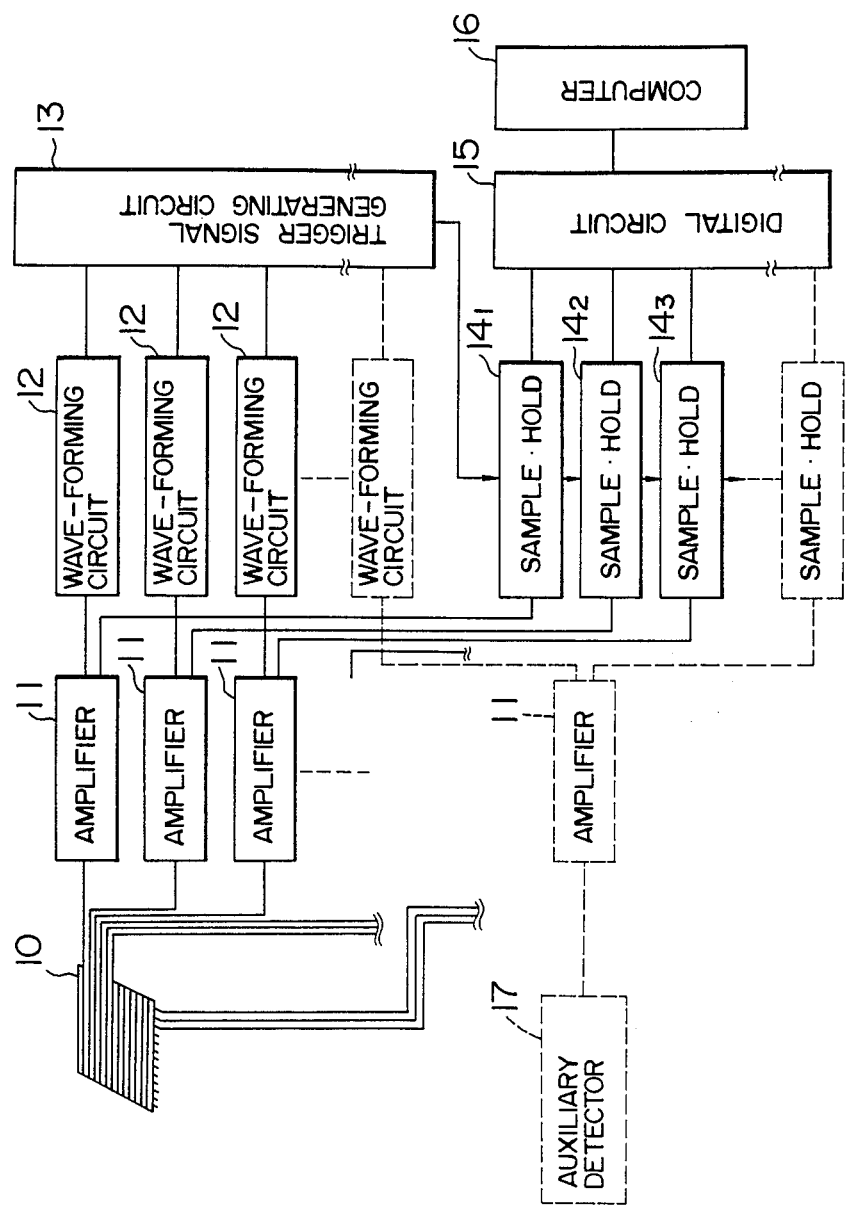

GAMMA RAY MEASUREMENT UTILIZING MULTIPLE COMPTON SCATTERING

BACKGROUND OF THE INVENTION

1. FIELD OF THE INVENTION

This invention relates to γ-ray measurement and in particular to γ-ray measurement utilizing multiple Compton scattering.

In this specification γ-ray means high energy photons and includes soft and hard X-rays. Specifically the object of this invention is photons having an energy from about 100 keV to about 5 MeV.

Further, a multiple Compton scattering, called hereinbelow reactions, includes both a phenomenon, by which a photon is scattered a plurality of times by the Compton effect and a phenomenon, by which it disappears at last while giving an electron its energy by the photoelectric effect.

2. DESCRIPTION OF THE RELATED ART

γ-ray is measured in various fields. Taking computer tomography (CT) as an example, there are roughly known two types, i.e. positron CT and single gamma CT. In the positron computer tomography (CT) a radioactive isotope emitting positrons is introduced in a human body, an animal or a plant and oppositely directed 2 photons, each of about 511 keV, generated at the pair annihilation of a positron and an electron are measured by the coincidence method by means of a number of γ-ray detectors arranged suitably, such as NaI, CsI, bismuth germanate ($Bi_4Ge_3O_{12}$, BGO), etc. In this way the spatial distribution of γ-ray sources, i.e. the isotope, is measured. The location of a radiation source is confined to a straight line connecting two detectors, which have detected the two photons by the coincidence method. Further, the position or distribution of radiation sources of a same nature is measured 3-dimensionally by detecting a number of pairs of photons and treating statistically detected data by means of a computer.

Single gamma CT uses a shield. When a gamma ray is detected, a gamma ray source is estimated to be located on a line connecting a detector and a shield. A multiplicity of gamma rays from the same source are detected and such detected data are statistically processed in a computer to measure the position or distribution of gamma ray sources three-dimensionally.

In order to measure the position of incidence of the γ-ray, an assembly of a number of unit detectors is prepared and it is sufficient to examine which unit detector the γ-ray enters. The position of incidence can be detected, e.g. by forming diodes in a sheet shaped semiconductor substrate, forming a number of strip-shaped electrodes on the front and backside surfaces thereof, which cross perpendicularly to each other, and detecting between which electrodes electric current flows.

In order to know in which direction the γ-ray enters by means of a measuring device, single Compton method can be employed or another method can be employed by which a collimator is located in front of a γ-ray detector so that only γ-ray entering in a predetermined direction is detected.

A single Compton method is known for relatively low energy γ-ray, by which the incident direction or the polarization of the incident γ-ray is measured by using a single Compton scattering and another reaction. The direction on the polarization of X-ray coming from e.g. the universe is measured by means of a measuring device consisting of a position sensitive radiation detector disposed in the front portion, closer to the object to be measured, measuring the position of the Compton scattering and the energy of a recoil electron and an NaI scintillation counter disposed behind the detector by a suitable distance, which absorbs the X-ray or the γ-ray after the scattering, giving rise to scintillation, in order to measure its energy and position.

In the positron computer tomography (positron CT) the energy of the incident γ-ray is about 510 keV, which is sufficient to give rise to a plurality of Compton scatterings, i.e. which is an energy sufficient for every incident γ-ray to produce a plurality of detection signals within a detecting device.

In single gamma ray tomography, gamma rays ranging from several hundreds KeV to several MeV are used. Such gamma rays also have sufficient energy to produce a plurality of Compton scattering in a detector. The positron CT had the following restrictions.

(a) Since radioactive isotopes usable therefor are limited to nuclides, which emit positrons and have relatively short half-lives, it can be utilized only at a location, in the neighborhood of which such nuclides can be produced.

(b) The positional precision for defining the position of a radiation source is determined by the positional detecting precision of the γ-ray detecting device. A several millimeter square is the lower limit in practice at present even by using a collimator, etc. The use of the collimator brings about lowering of the counting efficiency.

(c) Because of the coincidence measurement the counting efficiency is very low and therefore a measurement takes a long time.

(d) The case where a radioactive isotope emitting positrons is used, since a positron is emitted with a relatively high energy, the position, where it annihilates to produce two photons, is apart from that of the radiation source.

The method for measuring γ-ray the single gamma CT utilizing by the single Compton scattering method has the following problems.

(a) In order to increase the counting efficiency, with which a photon induces a reaction within a detector as expected, it is necessary to increase the thickness of the sheet-shaped γ-ray detector, within which it is expected for the photon to induce a Compton scattering. On the contrary, in order to measure the positions of two successive reactions with a high precision and to increase the precision of the measurement of the direction of the incident γ-ray, it is necessary to reduce the thickness of the sheet-shaped detector. Since the detection efficiency is lowered when the thickness of the detector is reduced, the detection efficiency and the measurement precision are in a contradictory relation.

(b) When the energy of the γ-ray, which is to be measured, is above several keV, the number of reactions until a photon is finally absorbed is increased and the result, it is not possible to determine the direction of the γ-ray after a scattering, which is one of the most important factors for determining the direction of the incident γ-ray, with a high precision and therefore the measurement precision for the direction of the radiation and the position of the source is lowered.

(c) In order to increase the detection efficiency, the detector located behind the examined body should be predominantly thicker than the detector located in front thereof, within which it is expected for the first Compton scattering to be induced. In this case the probability is also increased, that the γ-ray passes through the front detector without reaction, produces a back scattering by the Compton effect in the proximity of 180° within the back detector, and is detected by the front detector. If the data thus obtained were interpreted, supposing that the first scattering is produced within the front detector and the second scattering is induced in the back detector, this gives rise to a sort of noise, which lowers the reliability of the measurement.

For these reasons the single Compton method is not practical for the energies above several keV. On the other hand the single gamma CT method using a collimator lowers extremely the counting efficiency, because the direction of the radiation is restricted by the fine collimator (made of e.g. lead). Further it is not practical, unless the distance between the γ-ray source and the detector is fixed in a certain extent and stereoscopic observation is impossible with a single

SUMMARY OF THE INVENTION

An object of this invention is to provide a γ-ray measurement having a high detection efficiency and a high measurement precision.

Another object of this invention is to provide a γ-ray measurement utilizing multiple Compton scattering with a high spatial precision of the measurement including direction and position and a high counting efficiency for a γ-ray source having a line spectrum.

In order to improve the positional precision of the measurement, thin sheet-shaped detectors are used. Further, in order to increase the detection efficiency, a plurality of sheet-shaped detectors are superposed on each other so that a great thickness can be obtained on the whole. In this way it is possible to measure the position of each of multiple reactions and the energy of the γ-ray (energy imparted to electrons). However, in the case where more than 2 reactions are detected, the direction of the incident γ-ray cannot be estimated, unless the sequence of the reactions is not known.

According to one aspect of the γ-ray measurement of this invention 2-dimensional position sensitive type radiation detectors are arranged in the form of a plurality of layers superposed on each other and the position of the reaction in each of the layers, where the reaction due to the γ-ray is produced, and the energy imparted to an electron at the position are detected. Supposing all the possible sequences of reactions for a plurality of reactions observed by one meausrement, it is checked whether the scattering at each of the positions of a part or all of the reactions, whose sequence is supposed, is consistent with the energy and the momentum conservation laws within predetermined tolerable errors or not. In this way a γ-ray measuring method can be provided, by which possible sequences of reactions are obtained while excluding the inconsistent sequences of reactions.

According to another aspect of this invention a γ-ray measuring device is provided, which comprises a detecting device consisting of 2-dimensional position sensitive type radiation detectors disposed in the form of a plurality o layers superposed on each other for detecting the position of the reaction due to the γ-ray in each of the layers and the energy imparted to an electron at the position, an anticoincidence counter having a window in its frontal portion and enveloping the detecting device for detecting the γ-ray, which is not absorbed by the detecting device by the photoelectric effect: and means, which, when a value detected by the anticoincidence counter is smaller than a predetermined value, supposing all the possible sequences of reactions for a plurality of reactions observed by one measurement, checks whether the scattering at each of the positions of a part or all of the reactions, whose sequence is supposed, is consistent with the energy and the momentum conservation laws within predetermined tolerable errors or not.

According to still another object of this invention a γ-ray measurement device is provided, which comprises a detecting device including 2-dimensional position sensitive type radiation detectors disposed in the form of a plurality of layers superposed on each other for detecting the position of the reaction due to the γ-ray in each of the layers and the energy imparted to an electron at the position; an auxiliary detector having a window in its frontal portion and enveloping the detecting device for detecting the γ-ray, which is not absorbed by the detecting device by the photoelectric effect; an anticoincidence counter having a window in its frontal portion and enveloping the auxiliary detector for detecting the γ-ray entering it along a direction, which does not pass through the window; and means, which, when a value detected by the anticoincidence counter is smaller than a predetermined value, supposing all the possible sequences of reactions for a plurality of reactions observed by one measurement, checks whether the scattering at each of the positions of a part or all of the reactions, whose sequence is supposed, is consistent with the energy and the momentum conservation laws within predetermined tolerable errors or not, thereby to limit or measure the direction of incidence of the gamma ray.

According to this invention 2-dimensional position sensitive radiation detectors are arranged in the form of a plurality of layers superposed on each other and the position of the reaction due to the incident γ-ray in each of the layers and the energy imparted to an electron at the position are detected. At least the energy relative to the position of the first reaction and the position of the second reaction are obtained while checking whether the scattering at each of the positions of a part or all of the reaction, whose sequence is supposed, is consistent with the energy and the momentum conservation laws within predetermined tolerable errors or not, supposing all the possible reactions observed by one measurement. In this way it is possible to measure the energy and the spatial distribution of the radiation source with a high precision by measuring a number of photons coming from the radiation source and treating statistically measurement results. In this case the radiation source, which is the object of the measurement, is a γ-ray emitting radioactive isotope injected or a small amount thereof remaining in a human body, an animal, a plant, a material, etc. However, this invention may be applied also to cases where many sorts of radioactive isotopes are mixedly distributed and thus it is possible to measure simultaneously the spatial distribution of each of the radioactive isotopes. Further it may be applied to the measurement of the energy and the spatial distribution of the X-ray emitted by excited atoms (or exotic atoms) as by the X-ray fluorescence method.

The present invention is also described in Kamae et al "A New Method to Measure Energy, Direction and Polarization of Gamma-rays" in *Nuclear Instruments and Methods in Physics Research,* North Holland (1987), which is incorporated herein by reference.

BRIEF DESCRIPTION OF THE DRAWINGS

FIG. 7 is a block diagram of an electric treating circuit used for the γ-ray measurement according to this invention;

Figure 1:
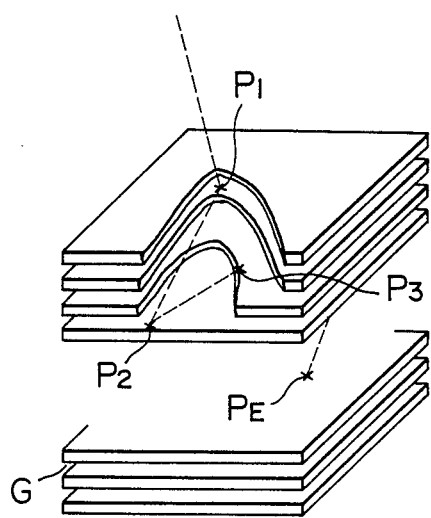
FIG. 1 is a perspective view of 2-dimensional position sensitive type radiation detectors in the form of multiple layers, partially cut-off, used for realizing this invention.

In the figures the reference numerals represent the following items; $S_1, S_2, \ldots, S_n$ 2-dimensional position sensitive radiation detectors; $P_1, P_2, \ldots, P_n$ the position of a 1st, a 2nd, ..., an n-th Compton scattering, respectively; $P_E$ the position of the absorption of the photon by the photoelectric effect; G a gap; C a conical surface defined by the γ-ray; $C_1, C_2, C_3$ a conical surface defined by a 1st, a 2nd and a 3rd γ-ray, respectively; $Q_1, Q_2, R_1, R_2, T_1, T_2$ the positions of the 1st and the 2nd Compton scattering of a 1st, a 2nd, a 3rd, ..., γ-ray, respectively; 1 2-dimensional position sensitive type radiation detectors in the form of a plurality of layers superposed on each other; 2 an anticoincidence counter; 3 an opening; 4 an auxiliary detector; 5 an anticoincidence counter; 10 2-dimensional position sensitive type radiation detectors; $11_1, 11_2$ amplifiers; $12_1, 12_2$ waveforming circuits; 13 a trigger signal generating circuit; $14_1, 14_2$ sample hold circuits; 15 a digital circuit; 16 a computer; 17 an auxiliary detector; 20 to 22 γ-ray measuring devices; and 23 the position of a radiation source.

DESCRIPTION OF THE PREFERRED EMBODIMENTS

An embodiment will be explained below, referring to figures.

Figure 2:
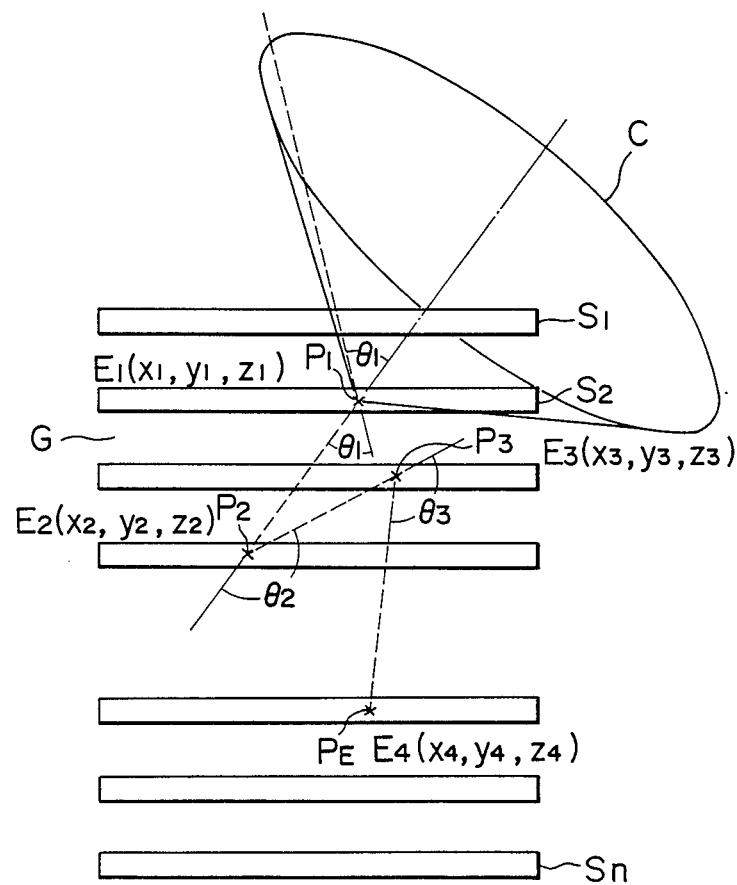
FIG. 2 is a scheme for explaining the method determining the incident direction of the X- or γ-ray by means of the 2-dimensional position sensitive type radiation detectors indicated in FIG. 1.
Figure 3:
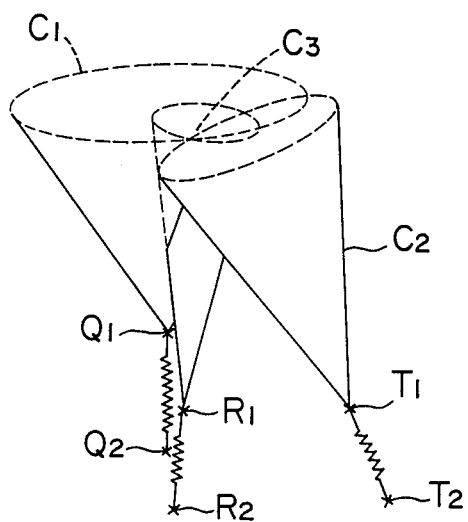
FIG. 3 is a scheme for explaining the method determining the 3-dimensional position of a radiation source, in the case where 3 photons emitted by a same radiation source are detected.

FIG. 1 is a perspective view of a γ-ray detector consisting of 2-dimensional position sensitive type radiation detectors superposed on each other in the form of a multi-layered structure; FIG. 2 is a scheme for explaining the method determining the incident direction of the γ-ray by means of 2-dimensional position sensitive type radiation detectors of multi-layered structure; and FIG. 3 is a scheme for explaining the method determining the 3-dimensional position of a radiation source, in the case where 3 photons emitted by a same radiation source are detected. In the figures, $S_1, S_2, \ldots, S_n$ represent 2-dimensional position sensitive radiation detectors; $P_1, P_2, \ldots, P_n$ the position, where a 1st, a 2nd, ... an n-th Compton scattering is produced (detected), respectively; $P_E$ the position, where the absorption of a photon is produced (detected), G a gap; C a conical surface defining the incident direction of the γ-ray, $C_1, C_2$ and $C_3$ in FIG. 3 indicate a conical surface defining the incident direction of a 1st, a 2nd and a 3rd γ-ray, respectively and $(Q_1, Q_2)$, $(R_1, R_2)$ and $(T_1, T_2)$ represent the position of the 1st and the 2nd Compton scattering of a 1st, a 2nd and a 3rd γ-ray, respectively.

In the figures, as the 2-dimensional position sensitive type radiation detector, semiconductor detectors made of high purity silicon, Li drift type silicon, high purity germanium or high purity gallium arsenide may be used, which has e.g. an area of about 10 cm² to 500 cm² and a thickness of about 200 μm to 5 mm, and more than 2 to about 50 layers of the detectors are preferably superposed on each other with a gap of about 1 mm to 2 cm. Preferably, all the reactions taking place for each incident gamma ray is detected. However the size and thickness of each detector sheet, the magnitude of the gap and the number of layers are not necessarily restricted to those described above. On the front and rear surfaces of a semiconductor detector strip-shaped p and n type electrodes are disposed so as to cross perpendicularly to each other. Apart from those described above, layers of proportional chambers filled with rare gas superposed on each other, drift type solid state detectors, etc. may be used. When a Compton scattering occurs therein, an electric signal is produced and the position thereof can be detected through the p and n type electrodes. Further the energy, which the γ-ray has lost, can be measured, based on the area of a pulse (current x time). However, the chronological order of reactions is not directly detected. Thus, the energy and momentum conservation laws are utilized to estimate the order. The incident direction of the incident γ-ray can be specified in a certain extent by using the direction and the energy of the γ-ray after the scattering and the condition determined by the energy and the momentum conservation laws at the scattering.

A measure of the precision for the position measurement required in the case where the 2-dimensional position sensitive type semiconductor detectors are used, depends on the thickness of the semiconductor layers and the gap therebetween. However, when they are 1 mm thick, it is about 1 mm square. Errors in the position measurement, when the positional precision is lower than it, and errors in the measurement of the energy, when the former is higher than the latter, are principal causes of errors in the distribution determination of the radiation source of the γ-ray. Noise produced in the semiconductor decreases with decreasing temperature. In the case where the semiconductor is germanium, it is preferable to keep it under about 200° K., and under 150° K., if possible. Also for silicon, in order to improve the precision of the energy measurement, it is preferable to keep it under about 200° K. For this purpose heat conductive (cooling) rods for cooling with liquid nitrogen, a refrigerator, etc. may be used.

γ-ray passing through a material and having an energy from about 100 keV to 5 MeV loses its energy by several Compton scatterings and finally it is absorbed by the photoelectric effect. By this scattering/absorption electric signals are produced in the semiconductor. However it is extremely difficult to determine the sequence of the pulses thus produced. Each of the position sensitive type radiation detectors $S_1$-$S_n$ is so thin that the probability that more than two Compton scatterings occur within a same layer, can be neglected. The precision of the position detection is improved with decreasing thickness of each of the layers and with more densely superposed layers. Further the number of all the layers of the detectors is so set that all the energy of the incident γ-ray is absorbed within the detectors with a high probability. Unless all the energy is absorbed within the detectors, it is difficult to estimate the sequence of scatterings by the theory described later. When the detecting device is so located that the direction passing through all the layers of the detecting device thus constructed is directed towards the examined body emitting the γ-ray, it is possible that the incident γ-ray undergoes a plurality of Compton scatterings within the assembly of the detectors with a high probability and that it is finally absorbed by the photoelectric effect. Therefore the position, where every reaction occurs, and the energy imparted to an electron by the reaction, i.e. the magnitude of the pulse, measured by means of the position sensitive type radiation detectors $S_1$-$S_n$, are taken-out in the form of electric signals and recorded in a computer, etc. after having been treated by means of a suitable electronic circuit. That is, the position, where the γ-ray undergoes a scattering/absorption, and the energy, which it loses thereby, are recorded. The recorded measurement results are treated on-line or off-line according to the principle, which will be explained below. Now, supposing that N: total number of the reaction points within the detecting devices constructed by 2-dimensional position sensitive type radiation detectors superposed on each other (total number of hits), i: number of the reaction point (i =1−N), $E_i$: energy imparted to an electron at the i-th reaction point, $(x_i, y_i, z_i)$: coordinates of the i-th reaction point, E: total sum of $E_i$ (energy of the incident γ-ray).

At first an event for which N >1 is selected. E is calculated and variations of the count (number of incident γ-rays) are plotted, the abscissa representing E, the ordinate the count, so as to obtain a spectrum. A line spectrum, which is the object to be examined, is selected from the spectrum. Then a window (energy region), which is wider than the spectrum width observed around the value of the energy of the line spectrum, is determined, so that only the events, whose E is within the window, are selected among all the events, i.e. a γ-ray, which is the object of the following data processing, is selected. Noise is reduced by the fact that the object to be measured is a γ-ray having a same energy.

At first, supposing for each of the γ-rays that the scattering angle at the i-th scattering be $\theta_i$, the rest mass energy of an electron be m, and the energy of the γ-ray before the i-th scattering be $E_{ib}$, the following equation is valid on the basis of the energy and the momentum conservation laws;

$$\cos(\theta_i) = 1 - \frac{mE_i}{E_{ib}(E_{ib} - E_i)}.$$

That is, if the energies before and after the scattering are known, the scattering angle is known and if the direction of the γ-ray after the scattering is known, the probability of the direction of the γ-ray before the scattering can be known as a point on a conical surface, whose semi-vertical angle is $\theta_i$. Then, supposing all the possible sequences of the reactions, it is checked whether the scattering at each of the reaction points is consistent with the equation described above led out from the energy and the momentum conservation laws within predetermined tolerable errors or not. If there is a sequence, which is consistent with the above equation, it is adopted as a correct possible sequence.

For example, in the case where the number of reactions N =4, there are 4!=4.3.2.1 =24 possible sequences, such as 1 2 3 4, 1 2 4 3, 1 3 2 4, 1 3 4 2, etc. If there is among them a sequence, which is consistent with the data of 3 Compton scatterings, it is registered as the correct sequence. If there are a plurality of sequences, which are consistent therewith, the probability that the γ-ray follows the relevant sequence in reality is estimated, and all the possible sequences are registered together with the weight given to each of the sequences, which is proportional to the probability. If there is no sequence satisfying the above condition, the relevant event is avoided. Depending on the thickness of each of the 2-dimensional position sensitive type radiation detectors and the total number of the layers, when N is great, it is possible also to check only a suitable number M (M <N) of scatterings, e.g. the first 4 or 5 scatterings and to omit the followings. That is, the check described above is effected for all the possible M scatterings among N. If there are a plurality of consistent sequences, they are registered with the weight attached to each of the events, the total sum of the weights being 1.

In this way it is possible to estimate correctly the sequence, according to which the reactions have occured, with a high probability and to confine the direction of the incident γ-ray to a conical surface, whose apex is the electric signal generating point, where it is presumed that the 1st Compton scattering has occured, and whose rotation axis is the straight line connecting the two points, where it is presumed that the 1st and the 2nd Compton scatterings have occured, respectively, as indicated in FIG. 2. The probability that the sequence according to which the reactions have occured is presumed correctly, is remarkably increased by checking each of reactions on the basis of the energy and the momentum conservation laws. Further, when the measurement is continued during a certain period of time, a number of γ-rays coming from a same radiation source are measured. When the radiation source remains still, the measurement precision of the energy and the direction is increased proportionally to the square root of the number of the counts. As indicated in FIG. 3, obtaining the 3-dimensional distribution of the radiation source, it is possible to know a stereoscopic image of the radiation source as intersections of a number of conical surfaces.

On the γ-ray measurement utilizing multiple Compton scattering described above it is premised that all the energy of the γ-ray is absorbed within the 2-dimensional position sensitive type radiation detectors by the Compton scattering and the photoelectric effect and that it is recorded. For example, for a plurality of reactions measured almost simultaneously, $\Sigma E_i$ is obtained and the sum of the energies is judged to be the energy of the incident γ-ray.

In practice, since both the integrated value of the thickness of the radiation detectors (product of the number of layers and the thickness of each of the layers) and the area of each of the layers are finite, a probability that a part of the total energy of the incident γ-ray goes out of the measuring device remains. The energy of the incident γ-ray cannot be obtained, even if $\Sigma E_i$ is obtained, for the γ-ray, which undergoes e.g. 4 reactions within the measuring device and finally goes out thereof. In this way, even when only a small part of the total energy goes out thereof, the energy spectrum of the γ-ray cannot be measured correctly. Further, because of shortage of the data also the direction cannot be measured correctly. Therefore it produces noises for the measurement of the energy spectrum and the distribution of the radiation source, which is the object of the measurement.

In order to minimize such noises, the anticoincidence method can be adopted.

Figure 4A:
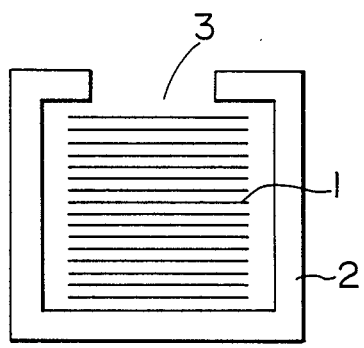
FIGS. 4A, 4B and 4C are schemes for explaining the γ-ray detection by the anticoincidence method, FIG. 4A being a cross-sectional view of the γ-ray detector viewed from the side, FIG. 4B being a plan view thereof, FIG. 4C being a flow chart showing the method for determining the incident direction.
Figure 4B:
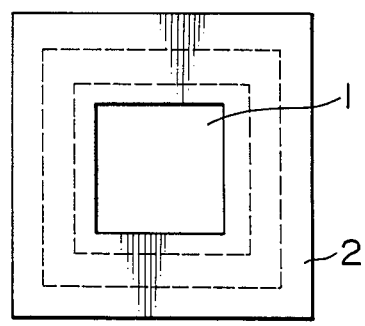
Figure 4C:
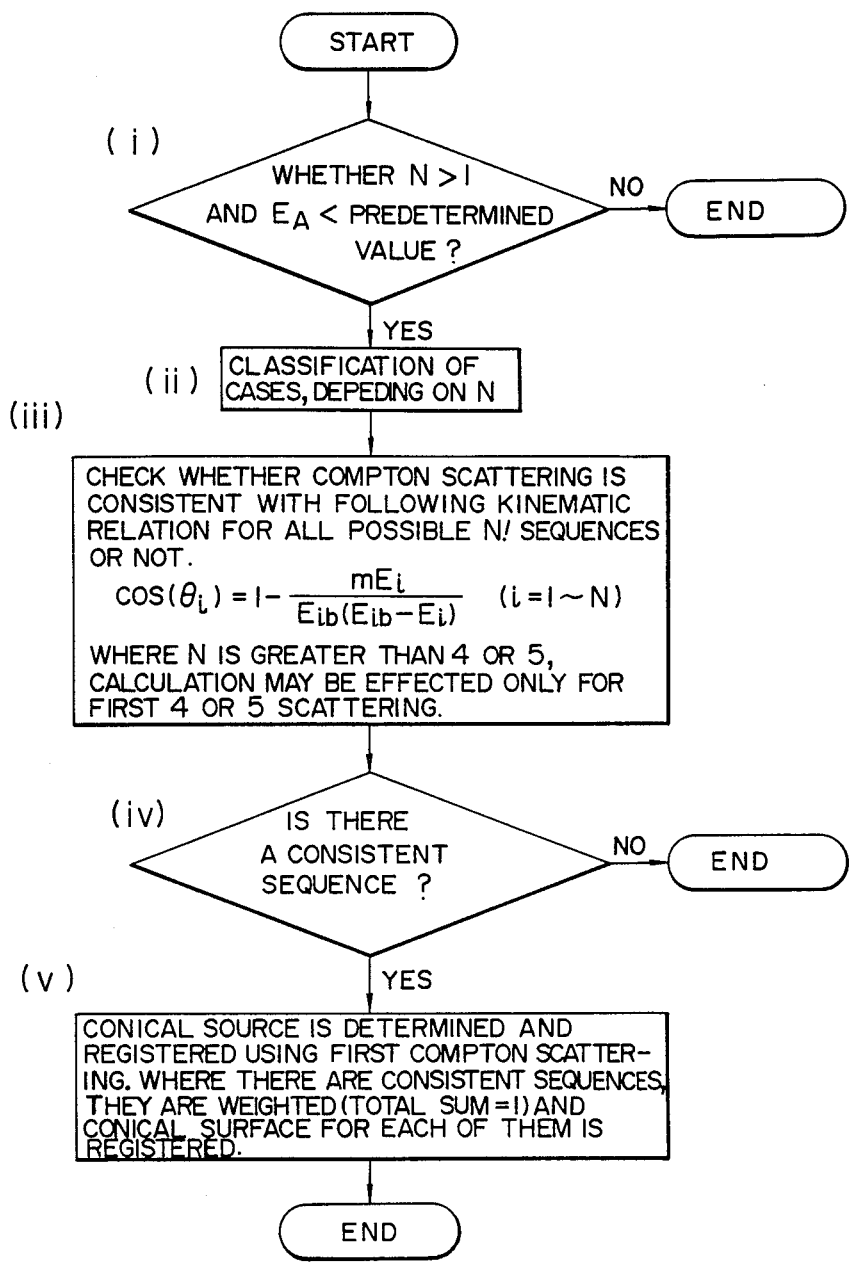

FIGS. 4A, 4B and 4C are schemes for explaining a γ-ray detecting device utilizing the anticoincidence method, FIG. 4A being a cross-sectional view of the device viewed from the side; FIG. 4B being a plan view thereof FIG. 4C being a flowchart. In FIGS. 4A and 4B reference numeral 1 is a detecting unit including 2-dimensional position sensitive type radiation detectors in the form of a plurality of layers superposed on each other; 2 is an anticoincidence counter, and 3 is an opening.

The anticoincidence counter 2 surrounds the assembly 1 of the multi-layered radiation detectors so as to cover it totally except for the opening 3, through which the γ-ray enters. When only slight energy is detected by this anticoincidence counter 2, all the signals due to the γ-ray detected simultaneously by the multi-layered radiation detectors are avoided. By this method even a measuring device consisting of a relatively small number of radiation detectors of small area can select and record only the cases where all the energy is measured and it is possible to reduce noise for a relevant line spectrum of the γ-ray.

FIG. 4C indicates a flowchart for determining incident direction of the Y-ray by using the anti-coincidence counter indicated in FIGS.. 4A and 4B.

In the figure an event is selected, for which the total number of hits N within the 2-dimensional position sensitive radiation detectors is greater than 1 and the total sum of the energies imparted to electrons within the anticoincidence counter 2 is smaller than a predetermined value (Step (i)). The cases are classified, depending on N and it is checked whether the Compton scattering satisfies the energy and the momentum conservation laws for all the possible N! sequences (Step (ii) and (iii)). If there is a consistent sequence (Step (iv)), as indicated in FIG. 2, the conical surface is determined and registered by using the first Compton scattering and if there are a plurality of consistent sequences, they are weighted (sum of weights =1) and the conical surface for each of them is registered (Step (v)). As stated previously, when N exceeds 4 or 5, if there is a sequence, for which a first suitable number M (M =4 or 5) of Compton scatterings are consistent, the calculation may be closed there. However all the possible M scatterings should be checked among N scattering, (N!/(N−M)!) times.

By the device indicated in FIG. 4, among the incident radiations, those which have run away to the anticoincidence counter are avoided. In order to measure these radiations, the measuring device may be constructed as indicated in FIG. 5.

Figure 5A:
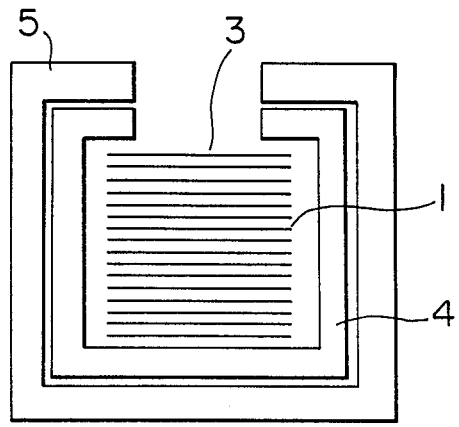
FIGS. 5A and 5B show a γ-ray detector having an auxiliary detector, FIG. 5A being a cross-sectional view thereof viewed from the side, FIG. 5B being a plan view thereof.
Figure 5B:
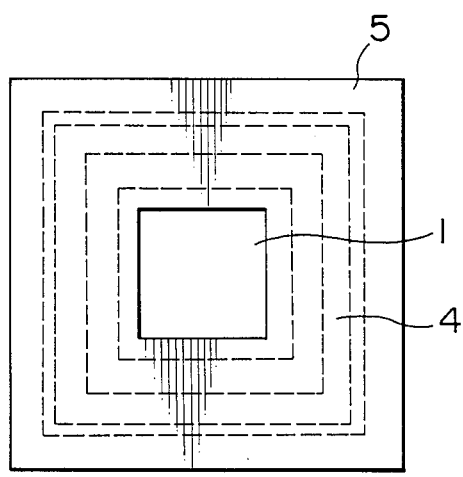

FIGS. 5A and 5B show another embodiment for detecting the total energy, FIG. 5A being a cross-sectional view of a detecting device viewed from the side, FIG. 5B being a plan view thereof, where reference numeral 4 represents an auxiliary detector and 5 indicates an anticoincidence counter.

In the figures the auxiliary detector 4 surrounds the assembly 1 of the multi-layered radiation detectors so as to cover it totally except for the opening 3, through which the γ-ray enters. Further the anticoincidence counter 5 surrounds them so as to cover them totally except for the opening 3. In this case the energy detected by the auxiliary detector 4 is added to the energies of the γ-ray detected simultaneously by the multi-layered radiation detectors so as to obtain the total energy of the incident γ-ray. Furthermore, when only slight energy is detected by the anticoincidence counter 5, it is recognized as external noise coming from the exterior, which does not pass through the opening and the signals induced by the γ-ray detected simultaneously by the multi-layered radiation detectors are avoided. The total energy of the γ-ray can be measured correctly by the fact that it is possible to calculate the total energy by adding also that detected by the auxiliary detector, and it is possible to obtain the sequence of reactions within the 2-dimensional position sensitive radiation detectors, to obtain correctly a sequence of reactions of at least the first and the second scatterings. In this way, even ith a simple measuring device consisting of only a small number of radiation detectors of small area, it is possible to measure the total energy, which permits to effect measurement by the multiple Compton scattering method with a smaller detector unit.

The embodiment indicated in FIGS. 5A and 5B using the auxiliary detector or side counter differs from that indicated in FIG. 4C only in that in the treatment of measured data the energy detected by the auxiliary detector is included in the total energy and in the other points the former is identical to the latter.

Figure 6:
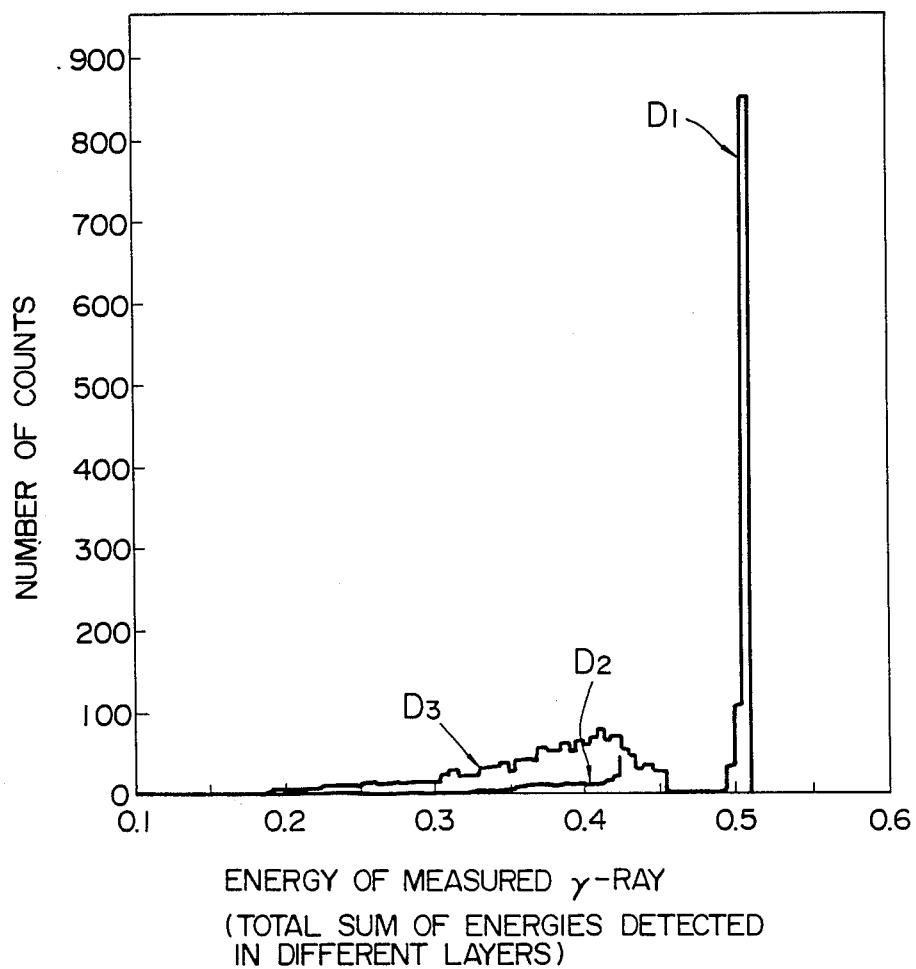
FIG. 6 indicates an energy spectrum obtained by using a measuring device having the anticoincidence counter.

FIG. 6 shows an energy spectrum obtained by means of a measuring device having an anticoincidence counter, from which the cases where an energy above 50 keV is detected by the anticoincidence counter are excluded, in which $D_1$ is a line spectrum of 0.511 MeV; $D_2$ is an energy spectrum, from which the cases where an energy above 50 keV is detected by the anticoincidence counter are excluded; and $D_3$ is an energy spectrum before the exclusion.

From the figure it can be seen that noise is reduced by using the anticoincidence counter.

As the auxiliary counter and the anticoincidence counter, semiconductor detectors or scintillation counters made of CsI, NaI, bismuth germanate (BGO), etc. can be used. In order to detect the γ-ray from about 100 keV to about 5 MeV without losing it partially, a thickness greater than about 2 cm is necessary. Both the auxiliary detector and the anticoincidence counter should cover totally the 2-dimensional position sensitive radiation detectors without any gap except for the opening, through which the γ-ray enters, a passage of conductors for taking out electric signals, a passage of cooling rods (not shown in the figure), etc. For this purpose it is easier to fabricate them in an assembly of a plurality of semiconductor detectors or scintillation counters than in one body. Furthermore, in order to take out electric signals, photomultiplies, avalanche type photodiodes, PIN type photodiodes, etc. may be used.

FIG. 7 indicates the block diagram of an electric signal processing circuit for the γ-ray measurement, which is an embodiment of this invention, in which reference numeral 10 is a 2-dimensional position sensitive radiation detector; $11_1$, $11_2$ are amplifiers; $12_1$, $12_2$ are waveform shaping circuits; 13 is a trigger signal generating circuit; $14_1$, $14_2$ are sample hold circuits; 15 is a digital circuit; 16 is a computer; and 17 is an auxiliary detector.

In the figure, a signal obtained by the 2-dimensional position sensitive radiation detectors 10 is amplified and wave-formed, which gives rise to a trigger signal at the trigger signal generating circuit 13. This trigger signal serves as a gate signal for sampling the detected signal and A/D converted data are sent to the computer, where they are stored and treated. In the case where the auxiliary detector is used, the signal obtained by the detector 17 is similarly treated, as indicated by broken lines.

Figure 8A:
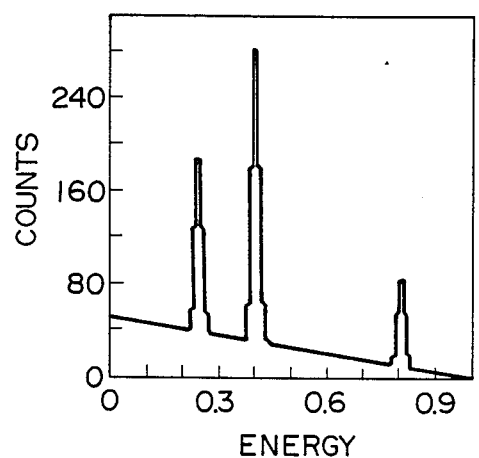
FIGS. 8A and 8B are schemes indicating an analyzing method, in the case where a plurality of photons are detected, FIG. 8A being an obtained energy spectrum, FIG. 8B indicating a spatial distribution of a γ-ray emitting radioactive isotope or fluorescent atoms emitting a selected line spectrum.
Figure 8B:
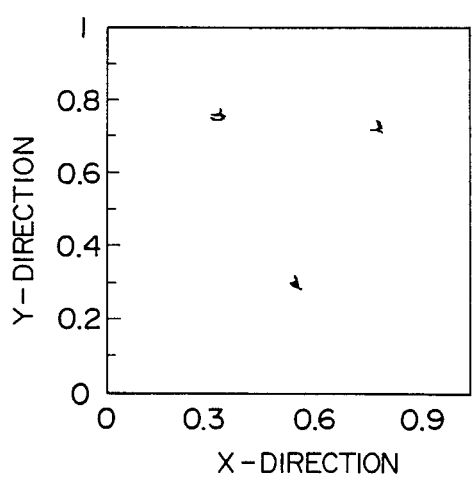

FIGS. 8A and 8B show an example of the analysis in the case where a number of γ-rays are observed. If a part of the energy spectrum is selected, as indicated in FIG. 8A it is possible to know the spatial distribution of the corresponding radioactive isotope or fluorescent atoms with a high precision. It is also possible to know also the spatial distribution, variations with respect to time, etc. for every kind of the radioactive isotope or the fluorescent atoms (energy spectrum).

Figure 9:
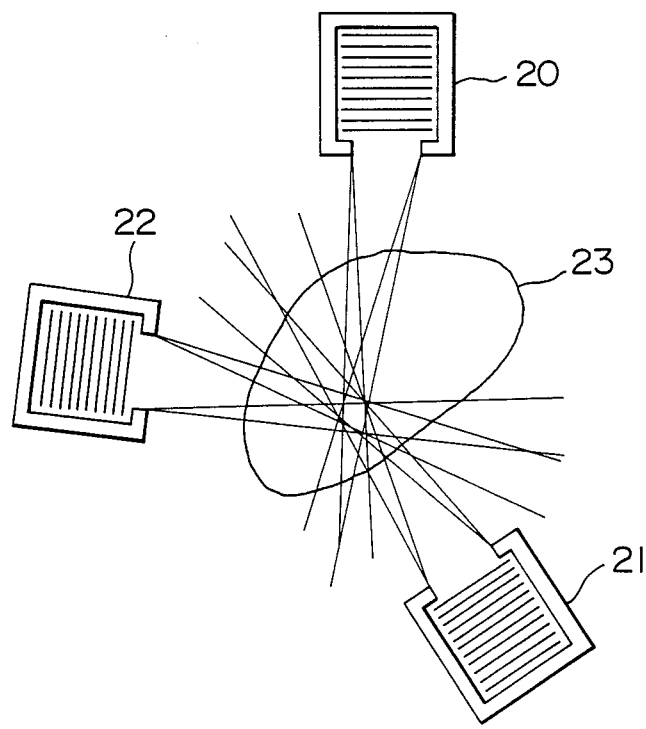
FIG. 9 is a schematical view of a measurement of the spatial distribution of the radioactive isotope or the fluorescent atoms by means of a plurality of measuring devices.

FIG. 9 is a scheme showing an example of the measurement of the spatial distribution of the γ-ray emitting radioactive isotope or the fluorescent atoms by means of 3 γ-ray measuring devices, in which reference numerals 20, 21 and 22 are the γ-ray measuring devices, source.

As indicated in the figure not only the statistical precision is improved, but also the angle of the stereoscopic view is increased and the precision of the 3-dimensional measured position is considerably improved by obtaining intersections of conical surfaces determined by each of the measuring devices by means of a plurality of γ-ray measuring devices according to this invention.

In this case also the measurement precision can be improved by means of a plurality of γ-ray measuring devices, each of which is provided with an auxiliary detector.

Figure 10A:
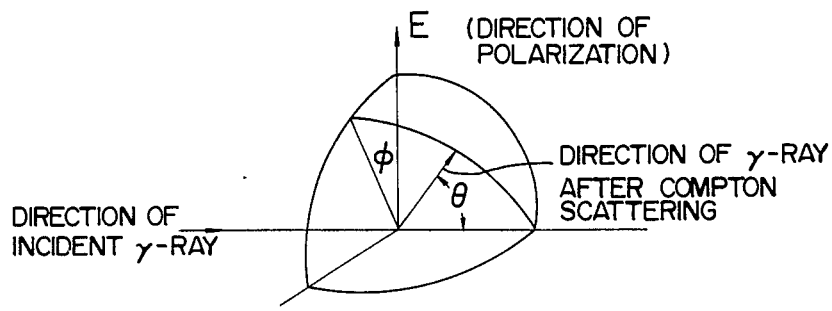
FIGS. 10A and 10B are schemes illustrating the dependence of the Compton scattering cross-section of a polarized γ-ray on the azimuthal angle.
Figure 10B:
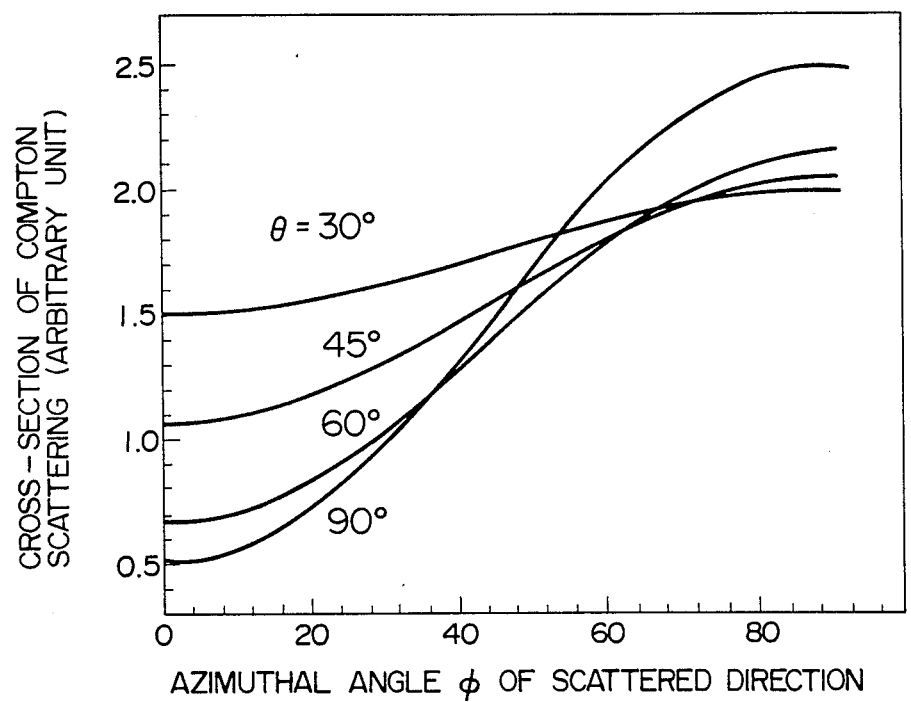

FIGS. 10A and 10B show the dependence of the Compton scattering cross-section of polarized γ-ray on the azimuthal angle, in which E indicates the direction of the electric vector of the incident γ-ray, $\phi$ the azimuthal angle comprised between the direction of the electric field of the incident γ-ray and the scattered direction and $\theta$ the polar angle of the scattering.

In the figure the incident γ-ray is 100% polarized at 0.511 MeV. The polarization factor can be known from the difference between the peak and the valley in a distribution curve and further the polarization plane can be obtained by knowing in which azimuthal angle the valley is.

Thus, if the energy of each of incident γ-rays is detected e.g. by means of 2-dimensional position sensitive type radiation detectors alone or in combination with an auxiliary detector, it is possible to effect measurements with a high precision (about 2 keV to about 10 keV), which is proper to the semiconductor detector, to confine the incident direction to a conical surface with a high precision (e.g. from about 1° to about 3°) and to measure the energy and the polarization plane simultaneously. It is also possible to obtain a resolving power smaller than 1 keV for the center energy of a line spectrum and a positional resolving power of 1 mm cube for the spatial coordinates by repeating the measurement during a certain period of time in order to accumulate data and by using a plurality of measuring devices, if necessary.

Even in the case where only the auxiliary detector made of NaI, CsI, etc. is used, only the precision in energy is worsened by a factor of about 10 and the incident direction and the polarization can be measured with a similar precision. Therefore it is possible to obtain a similar spatial resolving power.

Further, since it is possible to use any nuclide, if the γ-ray source has a line spectrum, it is possible to select a nuclide, which is easily taken-in in a specified organ of a human body or an animal, or a plant, a nuclide having a relatively long life, or a nuclide easily produced. Therefore it is possible to enlarge remarkably the application field. Furthermore, since a single γ-ray is measured it has a high counting efficiency and since the device is compact, it is possible to improve the positional measurement precision and to utilize a large stereoscopic angle by locating it closely to the object to be measured therefore measurements can be effected even with a weak radiation source. For this reason the distribution of the radiation source and variations in the intensity with respect to time can be also measured.

We claim:
1. A γ-ray measuring device comprising:
a plurality of γ-ray detectors superposed on each other, in each including means to determine the position of a reaction, when a γ-ray induces it therein and to measure the energy imparted to an electron by the γ-ray; and
calculation processing means treating measured data according to a predetermined program, which sets all the possible sequences of reactions for a plurality of reactions measured almost simultaneously, and treats the measured data on said plurality of reactions while checking for each of the sequences of reactions to determine whether they satisfy the energy and the momentum conservation laws, and leaving only the data with an estimated sequence of reactions which satisfy both the conservation laws.

2. A γ-ray measuring device comprising:
detecting means including 2-dimensional position sensitive type radiation detectors in the form of a plurality of layers superposed on each other for detecting the position of a reaction due to a γ-ray in each of the layers and the energy imparted to an electron at the position;
an anticoincidence counter having a window in its frontal portion and enveloping said detecting means for detecting the γ-ray, which is not absorbed by said detecting means by the photoelectric effect; and means for supposing when a value detected by the anticoincidence counter is smaller than a predetermined value, all the possible sequences of reactions for a plurality of reactions observed by one measurement, and checking whether the scattering at each of the positions of a part or all of the reactions, whose sequence is supposed, is consistent with the energy and the momentum conservation laws within predetermined tolerable errors or not.

3. A γ-ray measuring device according to claim 2, further comprising an auxiliary detector disposed between said detecting means and said anticoincidence counter, having a window in its frontal portion and enveloping said detecting means for detecting the γ-ray, which is not absorbed by said detecting means by the photoelectric effect.

4. A γ-ray measuring device according to claim 2, wherein said radiation detectors are semiconductor detectors.

5. A γ-ray measuring device according to claim 3, wherein said radiation detectors are semiconductor detectors and said auxiliary detector is a scintillation counter.

6. A γ-ray measuring method utilizing multiple Compton scattering comprising the following steps of:

disposing 2-dimensional position sensitive type radiation detectors in the form of a plurality of layers superposed on each other and detecting the position of a reaction due to an incident γ-ray at each of the layers and the energy imparted to an electron at the position; and supposing all the possible sequences of reactions for a multiple scattering process, checking whether the scattering at each of the positions of part or all of the reactions in each of the supposed possible sequences of reactions is consistent with the energy and the momentum conservation laws within predetermined tolerable errors or not, and obtaining analyzed date with estimated sequences of reactions which are consistent with the conservation laws.

7. A γ-ray measuring method utilizing multiple Compton scattering according to claim 6, wherein the energy of the incident γ-ray is calculated by adding all the energies detected in the detectors where reactions are induced.

8. A γ-ray measuring method utilizing multiple Compton scattering according to claim 6, wherein the direction of the incident γ-ray is obtained by using the estimated sequence of reactions.

9. A γ-ray measuring method utilizing multiple Compton scattering according to claim 6, wherein the polarization plane or the polarization factor of the incident γ-ray is obtained on the basis of the distribution of the Compton scattering cross-section vs. the azimuthal angle.

10. A gamma ray detector comprising a multi-layered structure of position-sensitive radiation detector sheets each being capable of detecting a two dimensional position of a reaction occurred therein and an energy associated with the reaction, said detector further comprising an auxiliary detector surrounding said multi-layered structure except at an entrance window area.

* * * * *